No. 825,516. PATENTED JULY 10, 1906.
H. CLIMER.
MACHINE FOR HUSKING GREEN CORN.
APPLICATION FILED NOV. 6, 1905.
3 SHEETS—SHEET 1.
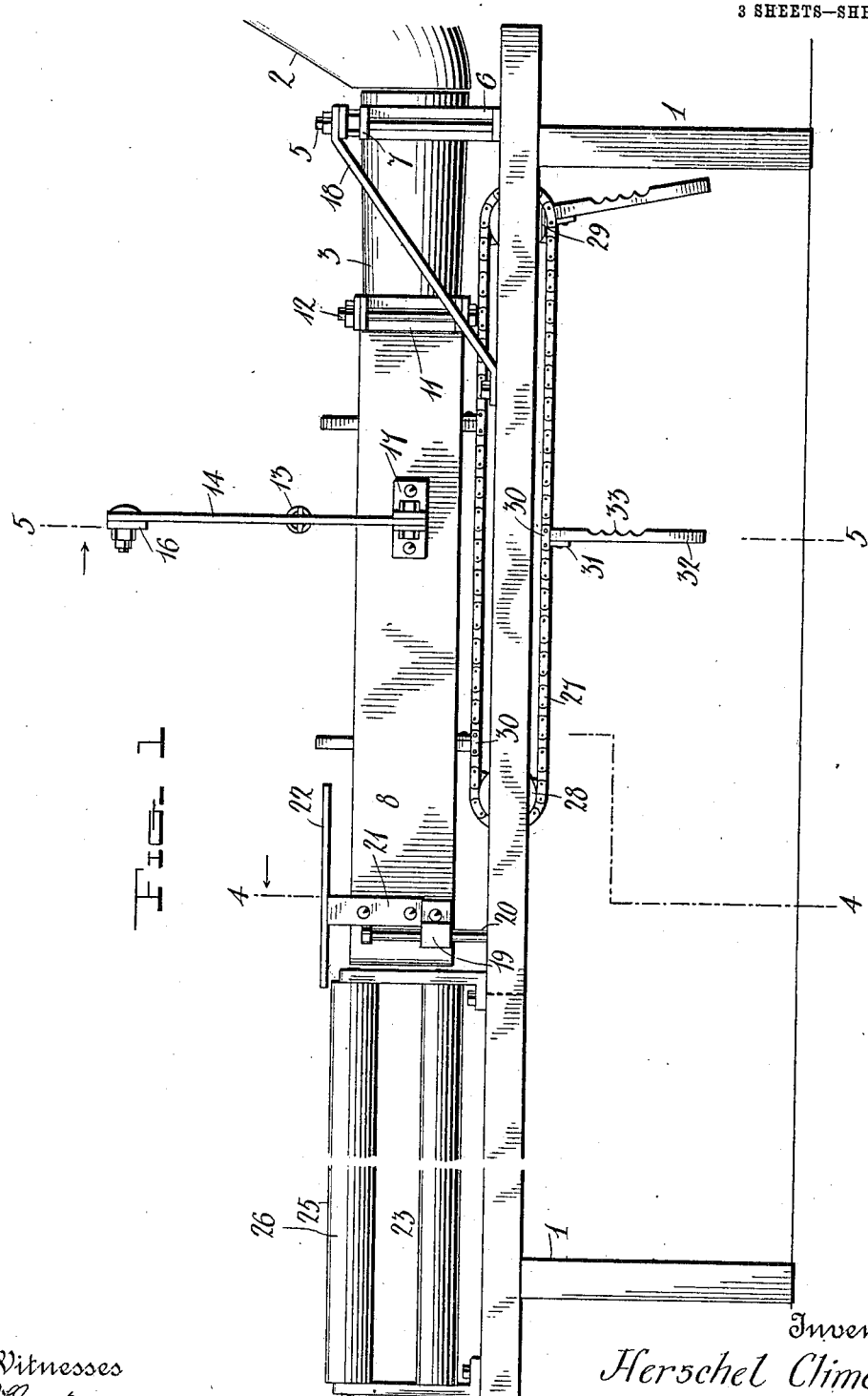
Witnesses
Inventor
Herschel Climer
by H. B. Wilson
Attorney

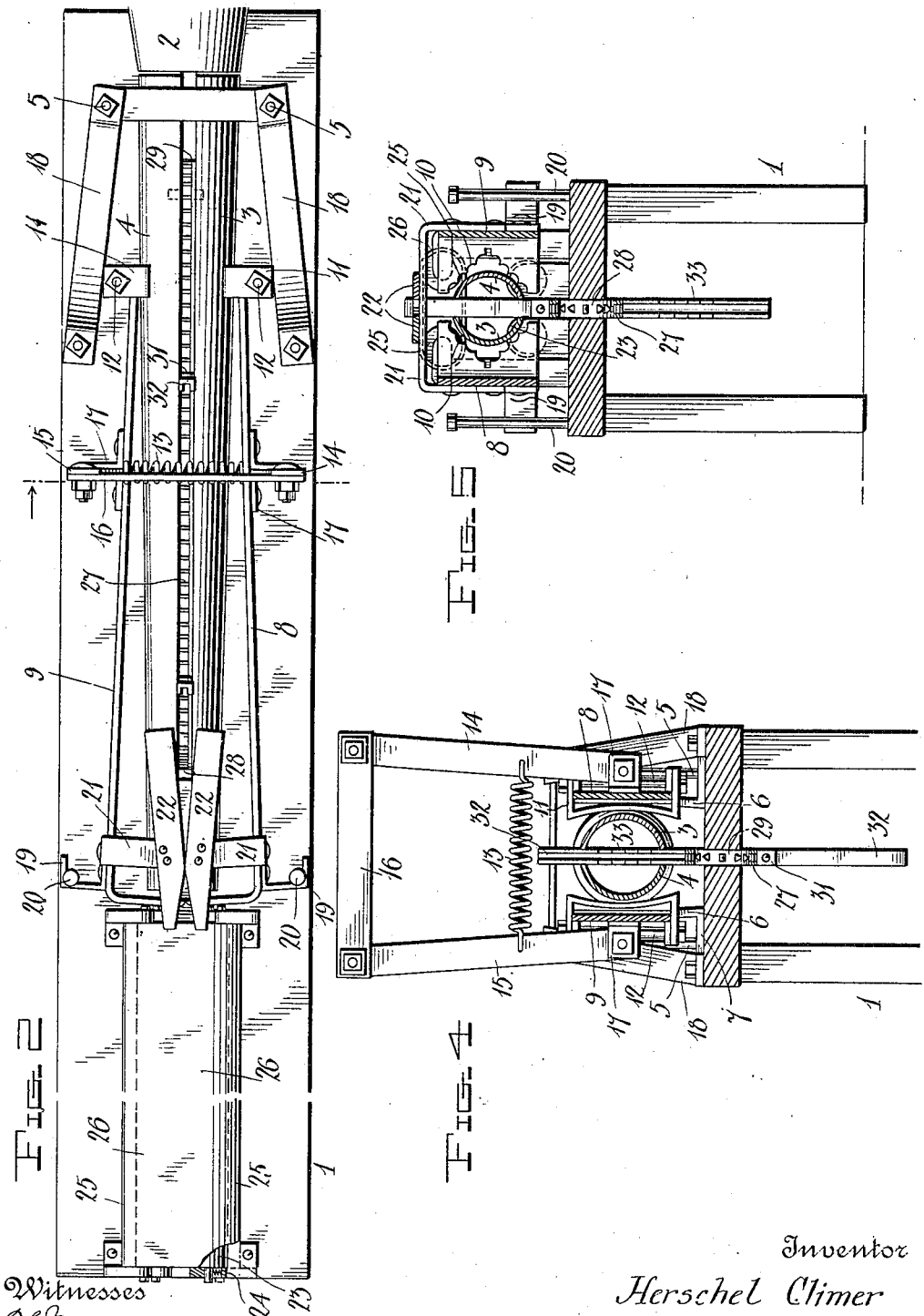

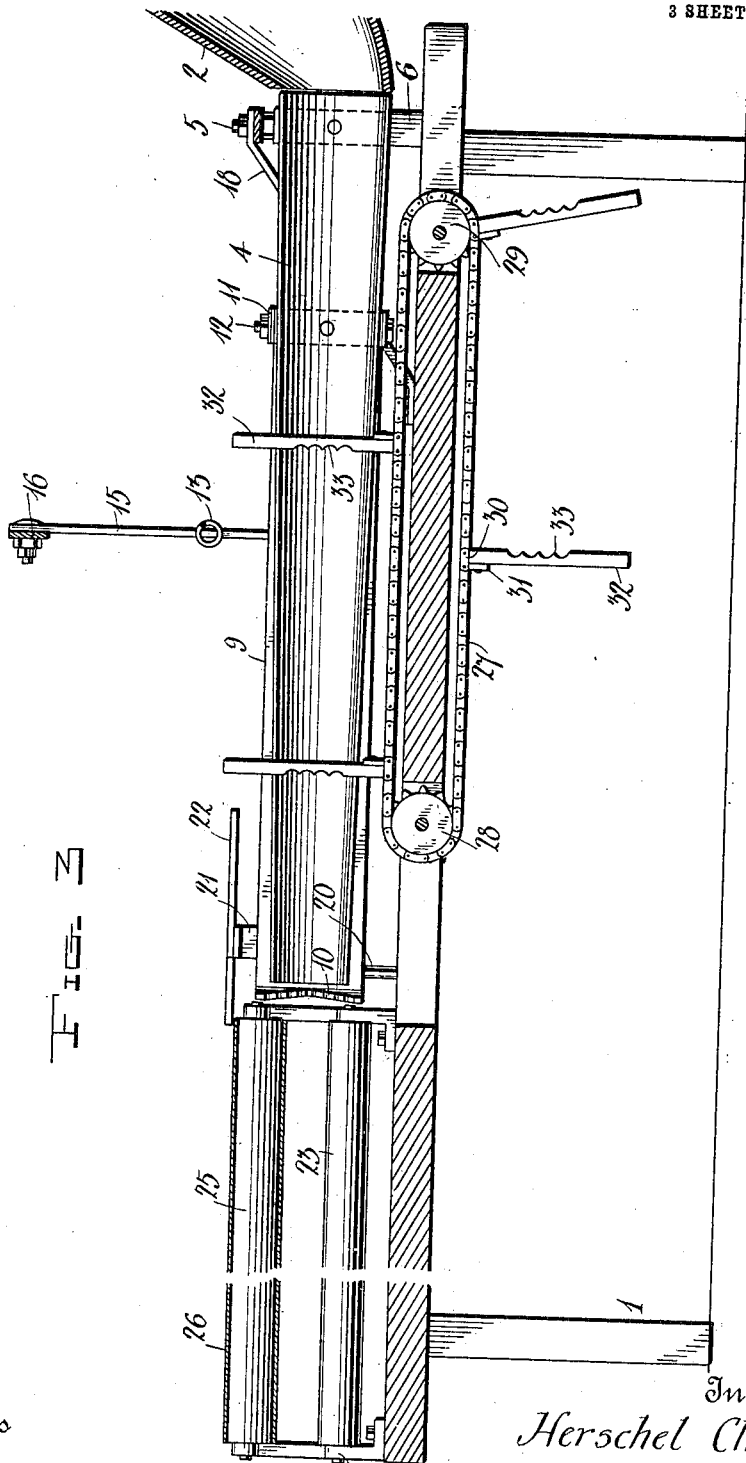

UNITED STATES PATENT OFFICE.

HERSCHEL CLIMER, OF CHILLICOTHE, OHIO.

MACHINE FOR HUSKING GREEN CORN.

No. 825,516. Specification of Letters Patent. Patented July 10, 1906.

Application filed November 6, 1905. Serial No. 286,119.

*To all whom it may concern:*

Be it known that I, HERSCHEL CLIMER, a citizen of the United States, residing at Chillicothe, in the county of Ross and State of Ohio, have invented certain new and useful Improvements in Machines for Husking Green Corn; and I do declare the following to be a full, clear, and exact description of the invention, such as will enable others skilled in the art to which it appertains to make and use the same.

This invention relates to machines for husking corn, and is designed more particularly for husking green corn or Indian corn; and one of the principal objects of the same is to provide means which will ruffle up the husks at the point or small end of the ear prior to the feeding of the corn to the husking-rolls. By this procedure the husking-rolls are not required to run as rapidly as in machines where the husking-rolls do all the work of stripping the husks from the ear.

Another object of my invention is to provide means whereby the ears of corn may be carried into a yielding tube and through yielding means for turning back or ruffling the husks at the point or smaller end of the ear.

These and other objects are attained by means of the construction illustrated in the accompanying drawings, in which—

Figure 1 is a side elevation of a machine embodying my invention. Fig. 2 is a plan view of the same. Fig. 3 is a longitudinal section of the same. Fig. 4 is a transverse section on the line 4 4 of Fig. 1, and Fig. 5 is a transverse section on the line 5 5 of Fig. 1.

Referring to the drawings for a more particular description of my invention, the numeral 1 designates a frame upon which the machine is mounted, and 2 is a hopper into which the corn may be placed with the smaller end of the ear downward. A tubular guideway comprises two semicircular members 3 4, which are pivoted at their rear ends upon vertical bolts 5, said bolts passing through brackets 6, secured to the members 3 4 and having outwardly-projecting ears 7, through which the bolts 5 pass. The tubular members 3 4 are tapered from their larger rear ends to the smaller discharge ends, and said members are secured to the brackets in a manner to provide a slot or opening between them at both their lower and upper edges for a purpose which will presently appear. The husking-blades or ruffling members 8 9 each comprises a plate having their terminal ends bent inward toward each other and provided each with a series of teeth or ruffling-blades 10. The rear ends of said members 8 9 are pivotally connected to brackets 11, secured to the sides of the members 3 4 by means of a vertical bolt 12 to give a yielding action to the members 3 4 and the ruffling-blades 10. A spring 13 is secured at its ends to upright bars 14 15, pivoted to the cross-bar 16. The lower ends of the upright bars 14 15 are pivotally connected to brackets 17, secured to the outer sides of the ruffling members 8 9. Braces 18 extend from the upper ends of the bolts 5 to the frame for supporting the tubular guideway and ruffling members near the discharge end of said ruffling members. A stop device 19 projects laterally from said blades, and a pin 20 serves to limit the movement of the stop device, and hence the lateral play of the ruffling members and guideway. Secured to the brackets 21, extending up in and over toward the upper center of the guideway are a pair of diverging bars 22.

The husking-rolls 23, which are preferably plain wooden rolls, are mounted within yielding bearings 24, and said rolls are disposed in longitudinal alinement with the guideway 3 4 and the ruffling members. Mounted immediately above the husking-rolls 23 are a pair of rolls 25, located at a slight distance apart and carrying a canvas apron or belt 26, the purpose of which is to turn the ears in order to present all parts of the husk to the husking-rolls 23. A sprocket-chain 27 passes around the sprocket-wheels 28 29, said sprocket-chain being located immediately under the guideway. The sprocket-chain is provided at intervals with special links 30, comprising an upright bar 31, having secured thereto a vertical carrier 32, provided with teeth 33, designed to engage the butt-end of the corn to carry it through the machine.

The operation of my invention may be described as follows: The ears of corn to be husked are placed in the hopper 2 with the smaller or tip ends downward, said ears being caught by the carrier 32 and carried forward through the tubular guideway 3 4, said carrier passing between said two members, and as the smaller end of the guideway is reached the ruffling members 8 9 engage the ends of the husks and turn them backward or ruffle them in such a manner as to make them easy to be engaged by the husking-rolls 23. After the husks have been ruffled or rolled upon the ear for a required distance the upper end of the vertical carrier 32, passing between the diverging bars 22, opens the members 3 4 and the ruffling-blades 10 to permit the ear to pass between the husking-rolls 23, the spring 13 then returning the members 3 4 and the blades 10 to their original position. The apron or belt 26, being rotated transversely to the husking-rolls, serves to turn the ears to present all parts of the husk to the husking-rolls, as will be understood. The ears stripped of their husks are dropped off the husking-rolls 23 and into any suitable receptacle.

While my husking-machine is designed more particularly for removing the husks from green corn prior to packing the same, it will be obvious that Indian corn or other grades of corn may be husked by means of the machine without material alteration in the parts.

One of the desirable qualities in a machine of this character is to remove the husks without bruising the kernels of corn, and with a machine constructed in accordance with my invention this desirable feature is provided for.

Various changes in the form, proportion, and the minor details of construction may be resorted to without departing from the principle or sacrificing any of the advantages of the invention.

Having thus described my invention, what I claim as new, and desire to secure by Letters Patent, is—

1. In a corn-husking machine, a tapering tubular guideway comprising two members spaced apart and pivotally mounted at one end, in combination with a pair of ruffling members pivotally connected to said guideway members and provided with ruffling-blades, means for holding said guideway members and ruffling members yieldingly, and means for carrying the corn through the guideway and presenting the ears to the ruffling-blades.

2. In a machine of the character described, a yielding guideway for the corn, said guideway being pivoted to the frame of a machine, a pair of ruffling members pivotally connected to the guideway and provided with inwardly-extending ruffling-blades at one end, a spring to hold said guideway members and ruffling members yieldingly together, in combination with means for carrying the corn through the guideway, and means for opening the guideway and ruffling-blades to permit the ears to pass out, substantially as described.

3. In a machine of the character described, the combination of a hopper, a tubular guideway comprising two semicircular members pivotally connected at one end and tapered toward their opposite ends, ruffling members pivotally connected to said guideway members and having notched teeth projecting inwardly upon their opposite ends, and means for carrying the ears between the guideway members and out between the ruffling members, substantially as described.

4. In a corn-husking machine, a tubular slotted and pivoted guideway, in combination with a pair of ruffling-blades provided with teeth, a pair of husking-rolls, and an apron or belt traveling transversely of the husking-rolls and adapted to deposit the ears of corn upon said husking-rolls, substantially as described.

In testimony whereof I have hereunto set my hand in presence of two subscribing witnesses.

HERSCHEL CLIMER.

Witnesses:
 JNO. H. GREENBAUM,
 HARRY V. HOPKINS.